United States Patent Office 3,047,637
Patented July 31, 1962

3,047,637
PREPARATION OF VINYLIDENE FLUORIDE
Franciszek Olstowski, Jones Creek, Tex., assignor to The Dow Chemical Company, Midland, Mich., a corporation of Delaware
No Drawing. Filed Jan. 25, 1960, Ser. No. 4,225
5 Claims. (Cl. 260—653.3)

This invention relates to a novel method for preparing vinylidene fluoride and more particularly involves the interaction of fluoroform with a hydrocarbon to produce the fluorohydrocarbon vinylidene fluoride.

Conventional methods of preparing vinylidene fluoride involve the use of expensive reactants. One such method involves refluxing $CF_3CH_2I$ in ethyl ether in the presence of magnesium, Henne, Journal American Chemical Society, volume 60, page 2275. Another method involves the pyrolyzing of $CF_3CH_3$, Downing et al., U.S. Patent 2,480,560. Such methods are relatively expensive, detracting from their commercial importance.

It is an object of the present invention to provide a new and improved method of preparing vinylidene fluoride. Another object is to provide such a method for producing vinylidene fluoride from relatively inexpensive starting materials in a relatively inexpensive procedure. Still other objects will become apparent hereinafter.

The above objects are accomplished in accordance with my invention which comprises contacting vapors of fluoroform together with a substantially equimolecular proportion of hydrocarbon selected from the group consisting of methane, ethane and ethylene at a temperature of from about 700° C. to about 1100° C. and separating the vinylidene fluoride from the reaction mixture.

The fluorocarbon radical will be supplied in accordance with our invention by fluoroform. The hydrocarbon radical will be supplied by methane, ethane and ethylene.

The fluoroform is passed through the reactor together with a substantially equimolecular proportion of the hydrocarbon. Variations in the reactant ratio of the order of 5:1 to 1:5 showed no substantial effects on the conversions and yields.

The reactor is heated to temperatures of from about 700° C. to about 1100° C. At temperatures materially below 700° C., the conversion is too low to be practicable and temperatures below 600° C. are generally inoperative. At temperatures materially in excess of 1100° C., excessive degradation of the reactants occurs. Optimum conversions and yields are generally obtained at temperatures of from about 700° C. to about 850° C.

Contact times, as expressed herein, are based on the time the reactant gases spend in that portion of the reactor that is within 100° C. of the temperature indicated for the operation. In our process, the contact time will be within the range of from about 0.1 second to about 10 seconds. Usually insufficient conversion occurs below 0.1 second, while excessive degradation to hydrogen fluoride occurs at contact times of more than 10 seconds.

My process will usually and preferably be carried out at atmospheric pressures, that is, a pressure of approximately one atmosphere. However, higher or lower variations in the range of 0.1 to 10 atmospheres have little or no effect on the conversions and yields.

The products of the reaction passing from the reactor will usually be scrubbed in caustic solution in order to remove acidic products from the gaseous stream, and thereafter the vinylidene fluoride is separated in a conventional manner.

The following examples are given to more clearly illustrate our invention but are not to be construed as limiting the invention thereto:

Example 1

The reactor consisted of a nickel tube approximately 12 inches in length and having a diameter of ⅜ of an inch. The tube was heated by a 2 kilowatt Sentry tube furnace.

A premixed gaseous mixture of fluoroform ($CF_3H$) and methane ($CH_4$) was passed into the reactor at a ratio of approximately 0.4 cubic foot per hour and 0.2 cubic foot per hour, respectively.

The temperature of the outside of the tube was 900° C. and the contact time of the reactants in the tube was approximately 0.3 second.

The sample of the product gases from the reactor was analyzed by vapor phase chromatography and verified by infrared spectroscopy to contain 81.5 mole percent of fluoroform, 1.5 mole percent methylene fluoride, and 17.0 mole percent vinylidene fluoride.

Example 2

The reactor consisted of a nickel tube approximately 12 inches in length and having an inside diameter of ⅜ of an inch. Fluoroform was passed into the reactor at a rate of approximately 0.8 cubic foot per hour together with ethylene ($CH_2=CH_2$) at a rate of approximately 0.4 cubic foot per hour, the reaction tube surface temperature being approximately 850° C.

On analysis the product gases were found to contain approximately 58 percent vinylidene fluoride and the conversion per pass was approximately 26 percent.

Example 3

In a manner similar to the foregoing examples, ethane may be reacted with fluoroform at a temperature from 700° C. to 1100° C. with similar production of vinylidene fluoride.

Various modifications may be made in the present invention without departing from the spirit and scope thereof and it is to be understood that I limit myself only as defined in the appended claims.

I claim:
1. A process for preparing vinylidene fluoride which comprises contacting, at a temperature of from about 700° C. to about 1100° C., fluoroform with a hydrocarbon selected from the group consisting of methane, ethane, and ethylene, and separating vinylidene fluoride from the reaction mixture.
2. A process for preparing vinylidene fluoride which comprises contacting, at a temperature of from about 700° C. to about 850° C., fluoroform with a hydrocarbon selected from the group consisting of methane, ethane and ethylene, and separating vinylidene fluoride from the reaction mixture.
3. A process for preparing vinylidene fluoride which comprises contacting, at a surface reaction tube temperature of about 900° C. and for a contact time ranging from about 0.1 second to 10 seconds, fluoroform with a hydrocarbon selected from the group consisting of methane, ethane and ethylene, and separating vinylidene fluoride from the reaction mixture.
4. A process for preparing vinylidene fluoride which comprises contacting, at a temperature of from about 700° C. to about 1100° C. and for a contact time ranging from about 0.1 second to 10 seconds, methane with fluoroform, and separating vinylidene fluoride from the reaction mixture.
5. A process for preparing vinylidene fluoride which comprises contacting, at a surface reaction tube temperature of about 850° C., ethylene with fluoroform and separating vinylidene fluoride from the reaction mixture.

References Cited in the file of this patent
UNITED STATES PATENTS
2,687,440 McGrew _____ Aug. 24, 1954